United States Patent

Griesbach et al.

[11] Patent Number: 6,018,758
[45] Date of Patent: Jan. 25, 2000

[54] SQUARER WITH DIAGONAL ROW MERGED INTO FOLDED PARTIAL PRODUCT ARRAY

[75] Inventors: William R. Griesbach, Pocono Pines; Ravi Kumar Kolagotla, Breinigsville, both of Pa.

[73] Assignee: Lucent Technologies Inc., Murray Hill, N.J.

[21] Appl. No.: 08/903,300

[22] Filed: Jul. 30, 1997

[51] Int. Cl.[7] ...................................................... G06F 7/38
[52] U.S. Cl. ............................................................ 708/606
[58] Field of Search .................................. 364/722, 753, 364/754.01, 757, 758; 708/277, 606, 620, 625, 626

[56] References Cited

U.S. PATENT DOCUMENTS

| 3,610,906 | 10/1971 | Stampler | 364/753 |
| 5,337,267 | 8/1994 | Colavin | 364/753 |
| 5,629,885 | 5/1997 | Pirson et al. | 364/753 |

*Primary Examiner*—Chuong Dinh Ngo
*Attorney, Agent, or Firm*—David L. Smith

[57] ABSTRACT

A squarer generates an array of partial products. A method of squaring a representation of a number includes generating an array of partial products, combining the partial product on one side of a diagonal of the array with partial products on the other side of the diagonal to form a folded array of partial products, and combining each of at least one more than half of the partial products in the diagonal of the array with a corresponding one of the partial products in the folded array to produce a new folded array of partial products. In an alternative embodiment, the present invention is a circuit for squaring an n-bit representation of a number.

26 Claims, 4 Drawing Sheets

SQUARER WITH DIAGONAL ROW MERGED INTO FOLDED PARTIAL PRODUCT ARRAY

TECHNICAL FIELD

This invention relates generally to squarers and particularly to high-speed squarers having reduced numbers of partial products.

BACKGROUND OF THE INVENTION

A squarer can be implemented using a general purpose multiplier having both of the inputs tied together. However, such an implementation results in a squarer that requires a large silicon area to implement, and is slow in operation. One known technique to increase the speed of a squarer is to fold the partial product array over a diagonal of an original array of partial products. The folded array of partial products is shifted since a multiplication by two is a left shift by one bit position. The folded array of partial products is then reduced using any one of a number of standard techniques. For example, the folded array of partial products can be reduced using an array of carry-save adders, followed by a carry-propagate adder. The maximum number of partial products to be reduced, such as in a column, is $\lfloor n/2 \rfloor + 1$ when squaring an n-bit representation of a number.

A technique to further reduce the number of partial products is described in "A Fast Parallel Squarer Based On Divide-and-Conquer" published by T. Yoo, K. F. Smith, and G. Gopalakrishnan in IEEE Journal of Solid State Circuits, vol. 32, June, 1997, pages 909–912. The divide-and-conquer technique employs progressively more complex circuits to reduce the total number of partial products. However, the number of partial products in the largest column remains $\lfloor n/2 \rfloor + 1$ for an n-bit squaring operation. While the divide-and-conquer technique is an improved squaring method, increased speed can be achieved by decreasing the number of partial products in the control path of the squarer. Therefore, there is a need for a squarer that decreases the number of partial products in the critical path of the squarer.

SUMMARY OF THE INVENTION

In accordance with the present invention, a method of squaring a representation of a number includes generating an array of partial products, combining the partial products on one side of a diagonal of the array with partial products on the other side of the diagonal to form a folded array of partial products, and combining each of the partial products in the diagonal of the array other than the partial product represented by the least significant bit with a corresponding one of the partial products in the folded array to produce a new folded array of partial products. In an alternative embodiment, the present invention is a circuit for squaring an n-bit representation of a number.

DETAILED DESCRIPTION

Figure 2:
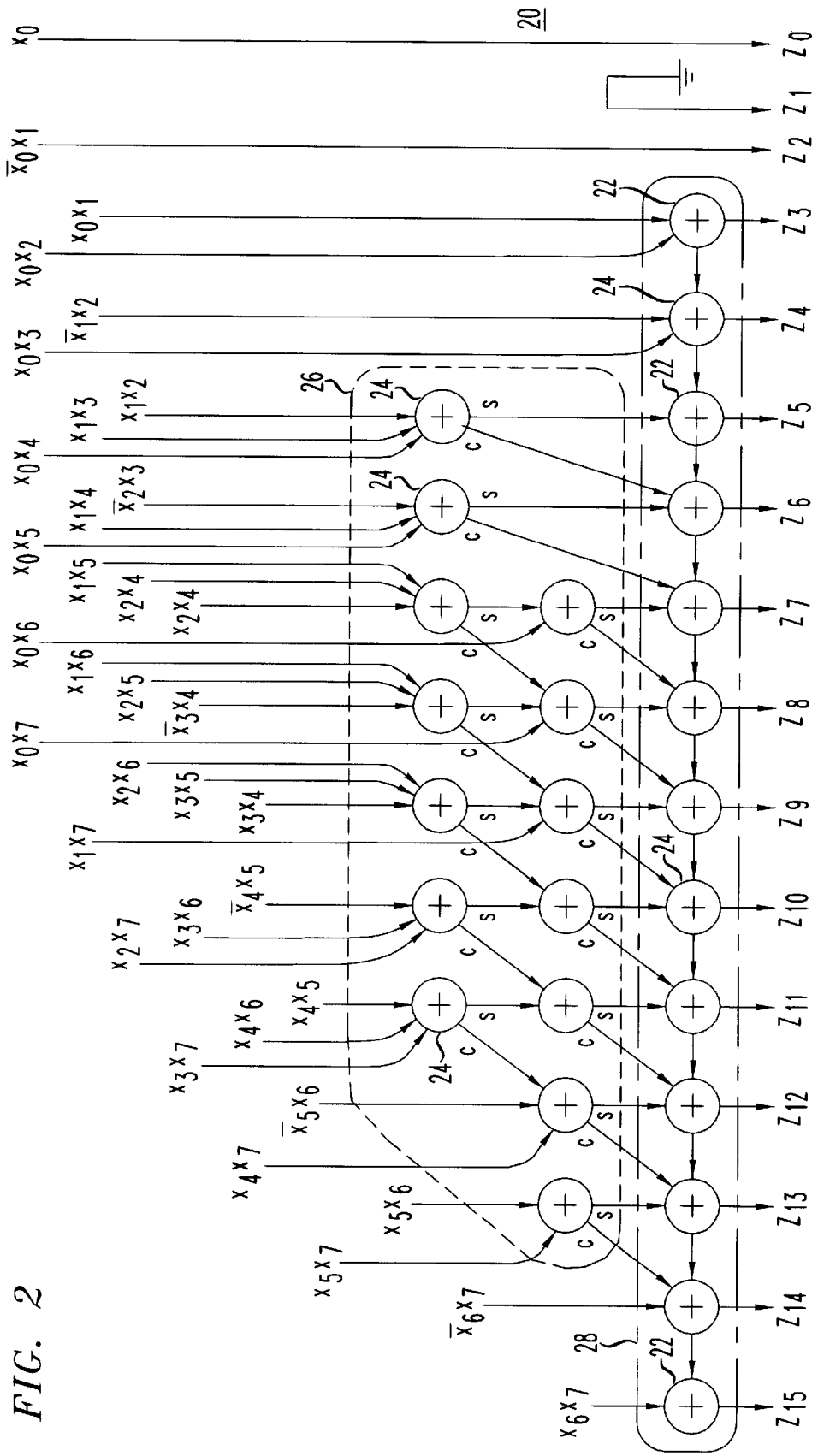
FIG. 2 is a schematic diagram of a circuit to perform the squaring operation.
Figure 4:
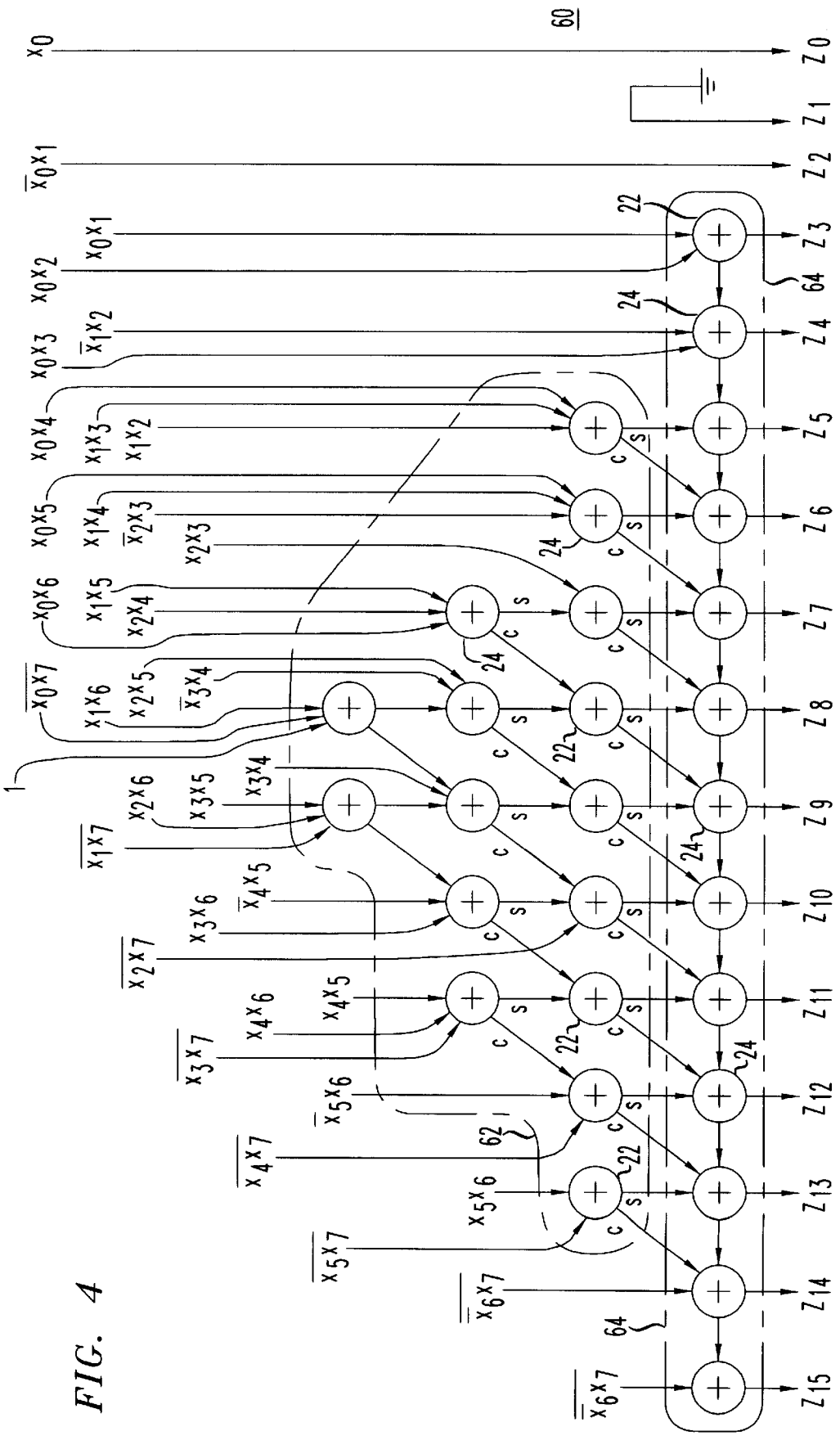
FIG. 4 is a schematic diagram of a circuit to perform the squaring operation of the two's complement form number.

Squarers are special purpose multipliers in which the multiplicand and multiplier are the same number, that is a number is multiplied by itself. By way of example, an n-bit representation of a number squared generates n squared partial products or partial product terms that need to be combined to generate the square, which has 2n bits. For example, when n is eight, an array of 64 partial products are generated as shown in Table 1 and the square has 16 bits as shown in FIG. 2 or 4. The partial product terms are arranged in columns by power of two for convenience of adding, as is known in the art. The partial product array is formed in n (here eight) rows, one for each of the bits in the representation of the number being squared. Columns here refer to the vertical alignment of partial products, and rows refer to the horizontal alignment of partial products, however, as is known in the art they could be interchanged. Equation 1 represents the squaring operation, individual partial products of which are shown in Table 1.

$$Z = \sum_{j=0}^{n-1} \sum_{k=0}^{n-1} x_j x_k 2^{j+k} \qquad (1)$$

TABLE 1

| | | | | | | | | | | | | | | | |
|---|---|---|---|---|---|---|---|---|---|---|---|---|---|---|---|
| | | | | | | | | $X_0X_7$ | $X_0X_6$ | $X_0X_5$ | $X_0X_4$ | $X_0X_3$ | $X_0X_2$ | $X_0X_1$ | $X_0X_0$ |
| | | | | | | | $X_1X_7$ | $X_1X_6$ | $X_1X_5$ | $X_1X_4$ | $X_1X_3$ | $X_1X_2$ | $X_1X_1$ | $X_1X_0$ | |
| | | | | | | $X_2X_7$ | $X_2X_6$ | $X_2X_5$ | $X_2X_4$ | $X_2X_3$ | $X_2X_2$ | $X_2X_1$ | $X_2X_0$ | | |
| | | | | | $X_3X_7$ | $X_3X_6$ | $X_3X_5$ | $X_3X_4$ | $X_3X_3$ | $X_3X_2$ | $X_3X_1$ | $X_3X_0$ | | | |
| | | | | $X_4X_7$ | $X_4X_6$ | $X_4X_5$ | $X_4X_4$ | $X_4X_3$ | $X_4X_2$ | $X_4X_1$ | $X_4X_0$ | | | | |
| | | | $X_5X_7$ | $X_5X_6$ | $X_5X_5$ | $X_5X_4$ | $X_5X_3$ | $X_5X_2$ | $X_5X_1$ | $X_5X_0$ | | | | | |
| | | $X_6X_7$ | $X_6X_6$ | $X_6X_5$ | $X_6X_4$ | $X_6X_3$ | $X_6X_2$ | $X_6X_1$ | $X_6X_0$ | | | | | | |
| $X_7X_7$ | $X_7X_6$ | $X_7X_5$ | $X_7X_4$ | $X_7X_3$ | $X_7X_2$ | $X_7X_1$ | $X_7X_0$ | | | | | | | | |

The terms of Equation 1 may be rearranged in three groups as shown in Equation 2.

$$Z = \sum_{j=0}^{n-1} x_j 2^{2j} + \sum_{j=1}^{n-1} \sum_{k=0}^{j-1} x_j x_k 2^{j+k} + \sum_{k=1}^{n-1} \sum_{j=0}^{k-1} x_j x_k 2^{j+k} \qquad (2)$$

The first term of Equation 2 represents the diagonal terms, as shown in Table 1 from lower left to upper right. The second term of Equation 2 represents the upper portion of the partial product array, that is those partial product terms upward and to the left of the diagonal partial product terms in Table 1. The third term in Equation 2 represents the portion of the partial product array below and to the right of the diagonal in Table 1.

Since the diagonal partial product terms are products of a bit with itself, each such diagonal partial product term can be replaced with a representation of the bit itself since the product of the bit and itself is the bit. Table 2 is the same as Table 1 with such a replacement of diagonal partial product terms.

TABLE 2

|  |  |  |  |  |  |  | $X_0X_7$ | $X_0X_6$ | $X_0X_5$ | $X_0X_4$ | $X_0X_3$ | $X_0X_2$ | $X_0X_1$ | $X_0$ |
|---|---|---|---|---|---|---|---|---|---|---|---|---|---|---|
|  |  |  |  |  |  | $X_1X_7$ | $X_1X_6$ | $X_1X_5$ | $X_1X_4$ | $X_1X_3$ | $X_1X_2$ | $X_1$ | $X_1X_0$ |  |
|  |  |  |  |  | $X_2X_7$ | $X_2X_6$ | $X_2X_5$ | $X_2X_4$ | $X_2X_3$ | $X_2$ | $X_2X_1$ | $X_2X_0$ |  |  |
|  |  |  |  | $X_3X_7$ | $X_3X_6$ | $X_3X_5$ | $X_3X_4$ | $X_3$ | $X_3X_2$ | $X_3X_1$ | $X_3X_0$ |  |  |  |
|  |  |  | $X_4X_7$ | $X_4X_6$ | $X_4X_5$ | $X_4$ | $X_4X_3$ | $X_4X_2$ | $X_4X_1$ | $X_4X_0$ |  |  |  |  |
|  |  | $X_5X_7$ | $X_5X_6$ | $X_5$ | $X_5X_4$ | $X_5X_3$ | $X_5X_2$ | $X_5X_1$ | $X_5X_0$ |  |  |  |  |  |
|  | $X_6X_7$ | $X_6$ | $X_6X_5$ | $X_6X_4$ | $X_6X_3$ | $X_6X_2$ | $X_6X_1$ | $X_6X_0$ |  |  |  |  |  |  |
| $X_7$ | $X_7X_6$ | $X_7X_5$ | $X_7X_4$ | $X_7X_3$ | $X_7X_2$ | $X_7X_1$ | $X_7X_0$ |  |  |  |  |  |  |  |

Equation 3 represents folding the lower half of the partial product array into the upper half and combining terms. The second term of equation 3 is the combination of the second and third terms of equation 2.

$$Z = \sum_{j=0}^{n-1} x_j 2^{2j} + \sum_{j=1}^{n-1} \sum_{k=0}^{j-1} x_j x_k 2^{j+k+1} \tag{3}$$

For example, combining $x_1x_0$ and $x_0x_1$ results in $2x_0x_1$. Since multiplication by two is equivalent to a left shift by one, the resultant product is left shifted from the diagonal by one power of two as shown in Table 3.

TABLE 3

|  |  |  |  |  | $X_0X_7$ | $X_0X_6$ | $X_0X_5$ | $X_0X_4$ | $X_0X_3$ | $X_0X_2$ | $X_0X_1$ | $X_0$ |
|---|---|---|---|---|---|---|---|---|---|---|---|---|
|  |  |  |  | $X_1X_7$ | $X_1X_6$ | $X_1X_5$ | $X_1X_4$ | $X_1X_3$ | $X_1X_2$ |  | $X_1$ |  |
|  |  |  | $X_2X_7$ | $X_2X_6$ | $X_2X_5$ | $X_2X_4$ | $X_2X_3$ |  | $X_2$ |  |  |  |
|  |  | $X_3X_7$ | $X_3X_6$ | $X_3X_5$ | $X_3X_4$ |  | $X_3$ |  |  |  |  |  |
|  | $X_4X_7$ | $X_4X_6$ | $X_4X_5$ |  | $X_4$ |  |  |  |  |  |  |  |
| $X_5X_7$ | $X_5X_6$ |  | $X_5$ |  |  |  |  |  |  |  |  |  |
| $X_6X_7$ | $X_6$ |  |  |  |  |  |  |  |  |  |  |  |
| $X_7$ |  |  |  |  |  |  |  |  |  |  |  |  |

Diagonal partial product terms having a non-diagonal partial product term in the same column are combined with the non-diagonal partial product term resulting in a sum value that replaces the non-diagonal partial product term and provides a carry term which is placed in the otherwise blank space adjacent (as shown in Table 3 to the left) of the diagonal partial product term. As such, the sum and carry terms replace the existing diagonal partial product term and non-diagonal partial product term that are added. The total number of partial products remain the same as before the combination, but n-1 partial products are replaced by new partial products which are placed one column to the left.

The second term of Equation 3 represents the folded and shifted partial product terms. The folded and shifted partial product terms can be factored into two components as shown in Equation 4.

$$Z = \sum_{j=0}^{n-1} x_j 2^{2j} + \sum_{j=1}^{n-1} \left\{ x_j x_{j-1} 2^{2j} + \sum_{k=0}^{j-2} x_j x_k 2^{j+k+1} \right\} \tag{4}$$

The sum of $x_j$ and $x_j x_{j-1}$ results in a sum of $x_j \overline{x}_{j-1}$ and a carry of $x_j x_{j-1}$ in the general case, as shown by Equations 5, 6 and 7.

$$x_j + x_j x_{j-1} = x_j (x_{j-1} + \overline{x}_{j-1}) + x_j x_{j-1} \tag{5}$$

$$x_j + x_j x_{j-1} = x_j x_{j-1} + x_j \overline{x}_{j-1} + x_j x_{j-1} \tag{6}$$

$$x_j + x_j x_{j-1} = 2 x_j x_{j-1} + x_j \overline{x}_{j-1} \tag{7}$$

Combining Equations 7 and 4 results in Equation 8.

$$Z = x_0 + \sum_{j=1}^{n-1} (x_j \overline{x}_{j-1} 2^j + x_j x_{j-1} 2^{2j+1}) + \sum_{j=2}^{n-1} \sum_{k=0}^{j-2} x_j x_k 2^{j+k+1} \tag{8}$$

In Equation 8, Z represents the square of an n-bit number. The first component term represents the least significant bit. The second component term of Equation 8 represents the sum and carry terms resulting from combining the diagonal partial product terms with the folded and shifted array of partial product terms. The third component term in Equation 8 represents the remaining partial product terms of the folded and shifted array of partial products. The resultant new folded array of partial products is represented in Table 4.

TABLE 4

|   |   |   |   |   |   | $X_0X_7$ | $X_0X_6$ | $X_0X_5$ | $X_0X_4$ | $\overline{X_0X_3}$ | $X_0X_2$ | $\overline{X_0X_1}$ | $X_0$ |
|---|---|---|---|---|---|---|---|---|---|---|---|---|---|
|   |   |   |   |   | $X_1X_7$ | $X_1X_6$ | $X_1X_5$ | $X_1X_4$ | $X_1X_3$ | $\overline{X_1X_2}$ | $X_0X_1$ |   |   |
|   |   |   |   | $X_2X_7$ | $X_2X_6$ | $X_2X_5$ | $X_2X_4$ | $\overline{X_2X_3}$ | $X_1X_2$ |   |   |   |   |
|   |   |   | $X_3X_7$ | $X_3X_6$ | $X_3X_5$ | $\overline{X_3X_4}$ | $X_2X_3$ |   |   |   |   |   |   |
|   |   | $X_4X_7$ | $X_4X_6$ | $\overline{X_4X_5}$ | $X_3X_4$ |   |   |   |   |   |   |   |   |
|   | $X_5X_7$ | $\overline{X_5X_6}$ | $X_4X_5$ |   |   |   |   |   |   |   |   |   |   |
| $\overline{X_6X_7}$ | $X_5X_6$ |   |   |   |   |   |   |   |   |   |   |   |   |
| $X_6X_7$ |   |   |   |   |   |   |   |   |   |   |   |   |   |

Figure 1:
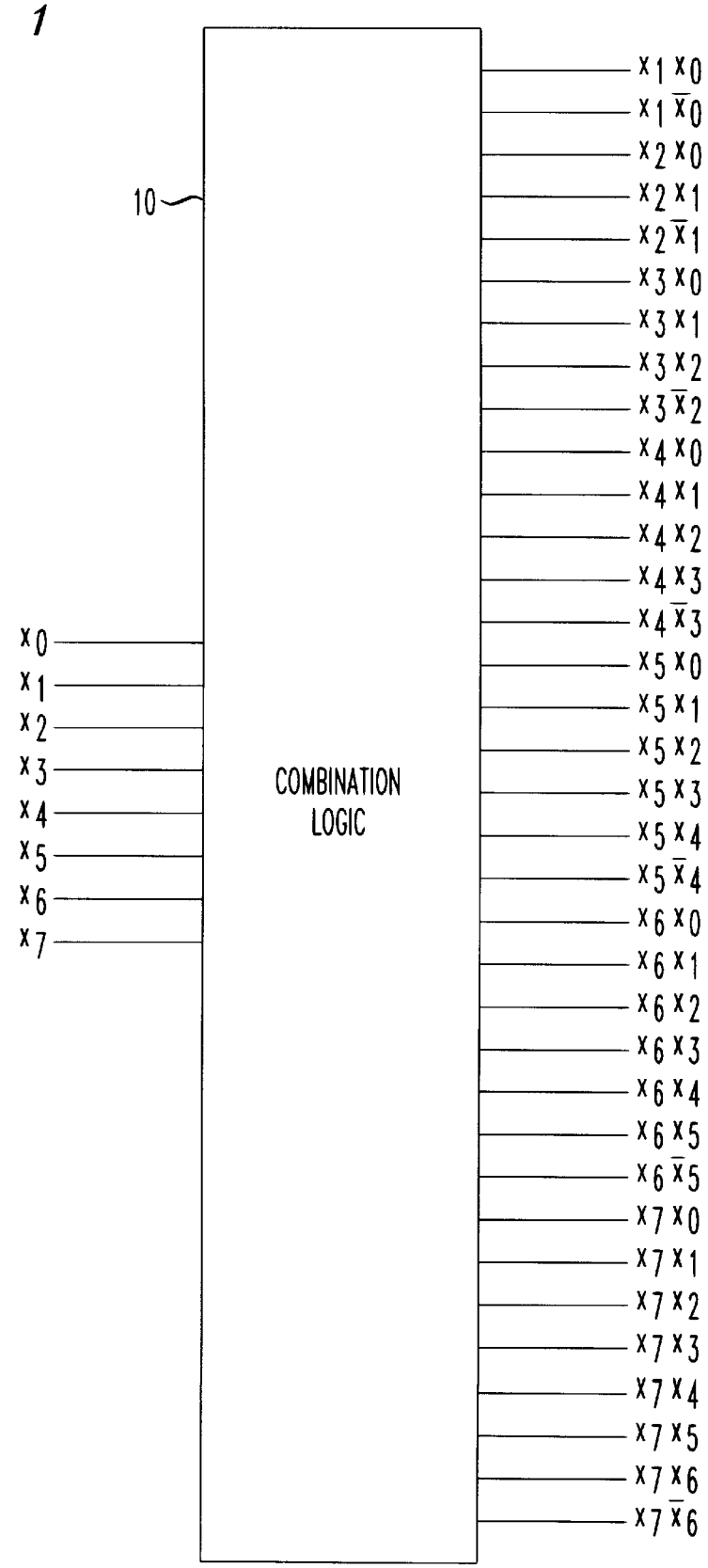
FIG. 1 is a circuit for generating partial products for an n-bit representation of a number.

FIG. 1 illustrates a circuit including combination logic 10 for combining the n-bit inputs to generate the partial products shown in Table 4 from a bit representation of the number being squared. One skilled in the art would know how to generate each of the partial product terms from the bit inputs. For example, the partial product $x_1x_0$ could be generated by a logical AND combination of the $x_0$ and $x_1$ inputs. Similarly, the $x_1\overline{x_0}$ partial product can be generated as an AND combination of the $x_1$ input and the inverse of the $x_0$ input.

FIG. 2 is a circuit 20 illustrating how the partial products of Table 4 are combined to result in the square of the n-bit number. Each of the two input adders 22 are half adders and each of the three input adders 24 are full adders. Adders 26 combine the terms of the resultant partial product array and provide outputs to adders 28. Adders 26 are configured as carry-save adders.

Adders 28 combine the inputs received from adders 26 to produce the 2-n bit representation of the square of the n-bit number being squared. Adders 28 are preferably carry-propagate adders comprising a carry-ripple adder.

The technique of the present invention may be used where the representation of a number being squared is an unsigned integer or is represented in two's complement form.

Equation 9 represents the squaring operation of a two's complement form of a number.

$$Z = \overline{x_{n-1}\overline{x}_{n-2}}2^{2n-1} + \overline{x_{n-1}\overline{x}_{n-2}}2^{2n-2} + 2^n + \qquad (9)$$

$$\sum_{j=0}^{n-3}\overline{x_j\overline{x}_{n-1}}2^{j+n} + x_0 + \sum_{j=1}^{n-2}(x_j\overline{x}_{j-1}2^{2j} + x_jx_{j-1}2^{2j+1}) +$$

$$\sum_{j=2}^{n-2}\sum_{k=0}^{j-2}x_jx_k2^{j+k+1}$$

Table 5 represents the partial product array obtained when squaring a two's complement form n-bit number, for example where n is 8.

TABLE 5

|   |   |   |   |   |   |   | 1 | $\overline{X_0X_7}$ | $X_0X_6$ | $X_0X_5$ | $X_0X_4$ | $X_0X_3$ | $X_0X_2$ | $X_0X_1$ | $X_0X_0$ |
|---|---|---|---|---|---|---|---|---|---|---|---|---|---|---|---|
|   |   |   |   |   |   |   | $\overline{X_1X_7}$ | $X_1X_6$ | $X_1X_5$ | $X_1X_4$ | $X_1X_3$ | $X_1X_2$ | $X_1X_1$ | $X_1X_0$ |   |
|   |   |   |   |   |   | $\overline{X_2X_7}$ | $X_2X_6$ | $X_2X_5$ | $X_2X_4$ | $X_2X_3$ | $X_2X_2$ | $X_2X_1$ | $X_2X_0$ |   |   |
|   |   |   |   |   | $\overline{X_3X_7}$ | $X_3X_6$ | $X_3X_5$ | $X_3X_4$ | $X_3X_3$ | $X_3X_2$ | $X_3X_1$ | $X_3X_0$ |   |   |   |
|   |   |   |   | $\overline{X_4X_7}$ | $X_4X_6$ | $X_4X_5$ | $X_4X_4$ | $X_4X_3$ | $X_4X_2$ | $X_4X_1$ | $X_4X_0$ |   |   |   |   |
|   |   |   | $\overline{X_5X_7}$ | $X_5X_6$ | $X_5X_5$ | $X_5X_4$ | $X_5X_3$ | $X_5X_2$ | $X_5X_1$ | $X_5X_0$ |   |   |   |   |   |
|   |   | $\overline{X_6X_7}$ | $X_6X_6$ | $X_6X_5$ | $X_6X_4$ | $X_6X_3$ | $X_6X_2$ | $X_6X_1$ | $X_6X_0$ |   |   |   |   |   |   |
| $\overline{X_7X_7}$ | $\overline{X_7X_6}$ | $\overline{X_7X_5}$ | $\overline{X_7X_4}$ | $\overline{X_7X_3}$ | $\overline{X_7X_2}$ | $\overline{X_7X_1}$ | $\overline{X_7X_0}$ |   |   |   |   |   |   |   |   |

When combining $x_ix_j$ terms with $x_jx_i$ terms, the resultant array of partial products is shown in Table 6.

TABLE 6

|   |   |   |   |   |   |   | 1 |   |   |   |   |   |   |   |   |
|---|---|---|---|---|---|---|---|---|---|---|---|---|---|---|---|
|   |   |   |   |   |   |   | $\overline{X_0X_7}$ | $X_0X_6$ | $X_0X_5$ | $X_0X_4$ | $X_0X_3$ | $X_0X_2$ | $X_0X_1$ | $X_0$ |   |
|   |   |   |   |   |   | $\overline{X_1X_7}$ | $X_1X_6$ | $X_1X_5$ | $X_1X_4$ | $X_1X_3$ | $X_1X_2$ |   | $X_1$ |   |   |
|   |   |   |   |   | $\overline{X_2X_7}$ | $X_2X_6$ | $X_2X_5$ | $X_2X_4$ | $X_2X_3$ |   | $X_2$ |   |   |   |   |
|   |   |   |   | $\overline{X_3X_7}$ | $X_3X_6$ | $X_3X_5$ | $X_3X_4$ |   | $X_3$ |   |   |   |   |   |   |
|   |   |   | $\overline{X_4X_7}$ | $X_4X_6$ | $X_4X_5$ |   | $X_4$ |   |   |   |   |   |   |   |   |
|   |   | $\overline{X_5X_7}$ | $X_5X_6$ |   | $X_5$ |   |   |   |   |   |   |   |   |   |   |
|   | $\overline{X_6X_7}$ | $X_6$ |   |   |   |   |   |   |   |   |   |   |   |   |   |
| $X_7$ |   |   |   |   |   |   |   |   |   |   |   |   |   |   |   |

Observing that the addition of terms $x_j$ and $x_ix_j$ results in a sum of $\overline{x_ix_j}$ and a carry of $x_ix_j$, and the sum of $x_j$, $\overline{x_ix_j}$ and two ones results in a sum of $\overline{\overline{x_ix_j}}$ and a carry of $\overline{x_ix_j}$, the partial product array of Table 6 can be rewritten as the partial product array of Table 7.

TABLE 7

```
                                                                    1
                                          X₀X₇  X₀X₆  X₀X₅  X₀X₄  X₀X₃  X₀X₂  X̄₀X̄₁  X₀
                                  X̄₁X̄₇  X₁X₆  X₁X₅  X₁X₄  X₁X₃  X̄₁X̄₂  X₀X₁
                          X̄₂X̄₇  X₂X₆  X₂X₅  X₂X₄  X̄₂X̄₃  X₁X₂
                  X̄₃X̄₇  X₃X₆  X₃X₅  X̄₃X̄₄  X₂X₃
          X̄₄X̄₇  X₄X₆  X̄₄X̄₅  X₃X₄
  X̄₅X̄₇  X̄₅X₆  X₄X₅
X̄₆X̄₇  X₅X₆
X̄₆X̄₇
```

In comparing Table 7 to Table 6, the number of partial products to be reduced has decreased by one in the column having the greatest number of partial product terms.

Figure 3:
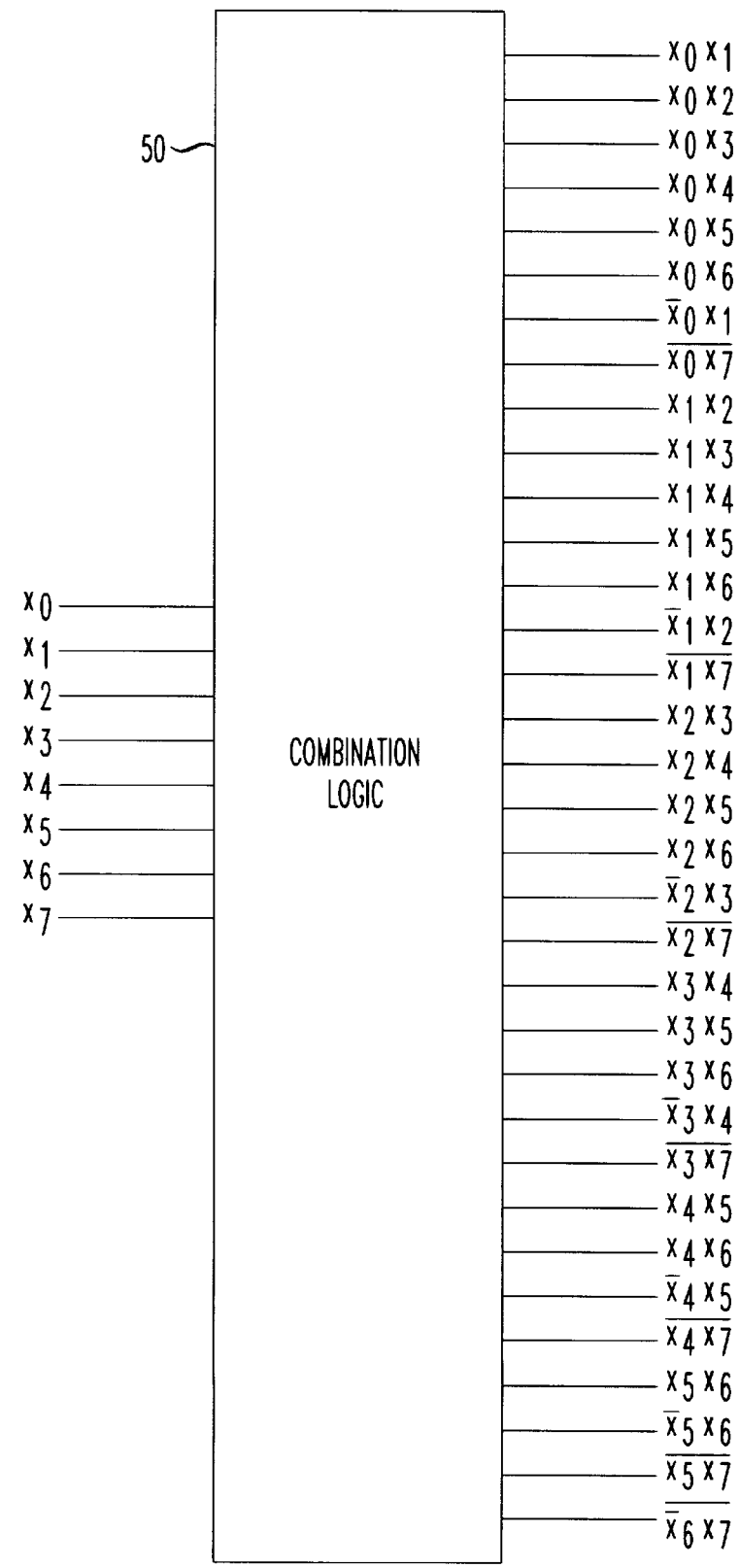
FIG. 3 is a cicuit for generating partial products from an n-bit two's complement form number.

FIG. 3 illustrates a circuit including combination logic 50 for combining the n-bit inputs representing a two's complement form number to generate the partial products shown in Table 7.

FIG. 4 is a circuit 60, similar to FIG. 2, for combining the partial products shown in Table 7 to produce the 2n bit squared output of the two's complement form representation of the number being squared. The two input adders 22 are half-adders and the three input adders 24 are full-adders. Adders 62 combine the partial product terms from each column and provide outputs to adders 64. Adders 62 are preferably carry-save adders.

Adders 64 receive the outputs from adders 62 and provide the 2 n bit squared representation of the n-bit two's complement form number being squared.

The invention may be fabricated using any known VLSI process in one or more integrated circuits. The integrated circuit, for example, may be for example a microcontroller, a microprocessor or a digital signal processor. Squarers in accordance with the present invention provide partial products in an array having fewer partial products in the critical path than known squarers, thereby reducing the time required to complete a squaring operation. The largest number of partial products in any given column for numbers represented as unsigned integers is $\rceil n/2\lceil$; for numbers represented in two's, complement form is $\rceil n/2\lceil +1$, where the number being squared is an n-bit number.

While the illustrative embodiment of the invention has been described illustrating an example having eight bits, the invention is not limited thereto.

While the illustrative embodiment of the invention has not been described as incorporating pipelining, one skilled in the art would recognize the enhanced computation efficiency available by utilizing pipelining in the design. Pipelining is achieved by initiating computation with a new dataset before completing computations with a previous set of data. The more latches used in pipelining, the greater the depth of pipelining. Pipelining causes an initial latency in computation time required to fill the pipeline, but maximizes the use of resources such as adders and multipliers.

The invention claimed is:

1. An integrated circuit including a circuit for squaring an n-bit representation of a number, comprising:

a partial product generator to generate partial product terms

| | |
|---|---|
| $x_0$ | |
| $x_j \bar{x}_{j-1}$ | where $1 \leq j \leq n-1$ |
| $x_j x_{j-1}$ | where $1 \leq j \leq n-1$ |
| $x_j x_k$ | where $2 \leq j \leq n-1$ and $0 \leq k \leq j-2$ | an adder to combine the partial products to result in a square of the n-bit representation of a number, whereby the adder combines the partial product terms to produce a sum Z in accordance with the equation $$Z = x_0 + \sum_{j=1}^{n-1}(x_j \bar{x}_{j-1} 2^j + x_j x_{j-1} 2^{2j+1}) + \sum_{j=2}^{n-1}\sum_{k=0}^{j-2} x_j x_k 2^{j+k+1}.$$

2. An integrated circuit as recited in claim 1, wherein the adder comprises:

an adder array to reduce the partial product terms to a plurality of sum terms and a plurality of carry terms; and an adder to combine the plurality of sum terms and the plurality of carry terms to provide the square of the n-bit representation.

3. An integrated circuit as recited in claim 2, wherein the adder array is comprised of carry-save adders.

4. An integrated circuit as recited in claim 2, wherein the adder for combining the sum and carry terms is a carry propagate adder.

5. An integrated circuit as recited in claim 1, wherein the adder comprises:

an adder array to reduce the partial product terms to a plurality of sum terms and a plurality of carry terms; and an adder to combine the plurality of sum terms and the plurality of carry terms to provide the square of the n-bit representation.

6. An integrated circuit as recited in claim 1, wherein the integrated circuit is a digital signal processor.

7. An integrated circuit including a circuit for squaring an n-bit representation of a number, comprising:

a partial product generator to generate partial product terms

| | |
|---|---|
| $x_0$ | |
| $x_j \bar{x}_{j-1}$ | where $1 \leq j \leq n-2$ |
| $x_j x_{j-1}$ | where $1 \leq j \leq n-2$ |
| $x_j x_k$ | where $2 \leq j \leq n-2$ and $0 \leq k \leq j-2$ |
| $x_j x_{n-1}$ | where $0 \leq j \leq n-3$ |
| $x_{n-1} \bar{x}_{n-2}$ | |
| 1 | | and;

an adder to combine the partial products to result in a square of the n-bit representation of a number.

8. An integrated circuit as recited in claim 7, wherein the adder combines the partial product terms to produce a sum Z in accordance with the equation $$Z = \overline{x_{n-1}\overline{x_{n-2}}}2^{2n-1} + \overline{x_{n-1}\overline{x_{n-2}}}2^{2n-2} + 2^n +$$
$$\sum_{j=0}^{n-3} \overline{x_j x_{n-1}} 2\, 2^{j+n} + x_0 + \sum_{j=1}^{n-2} (x_j\overline{x}_{j-1}2^{2j} + x_j x_{j-1}2^{2j+1}) +$$
$$\sum_{j=2}^{n-2}\sum_{k=0}^{j-2} x_j x_k 2^{j+k+1}.$$

9. An integrated circuit as recited in claim 8, wherein the adder comprises:
    an adder array to reduce the partial product terms to a plurality of sum terms and a plurality of carry terms; and
    an adder to combine the plurality of sum terms and the plurality of carry terms to provide the square of the n-bit representation.

10. An integrated circuit as recited in claim 7, wherein the adder comprises:
    an adder array to reduce the partial product terms to a plurality of sum terms and a plurality of carry terms; and
    an adder to combine the plurality of sum terms and the plurality of carry terms to provide the square of the n-bit representation.

11. An integrated circuit as recited in claim 10, wherein the adder array is comprised of carry-save adders.

12. An integrated circuit as recited in claim 10, wherein the adder for combining the sum and carry terms is a carry propagate adder.

13. An integrated circuit as recited in claim 7, wherein the integrated circuit is a digital signal processor.

14. An integrated circuit including a circuit for squaring an n-bit representation of a number, comprising:
    a partial product generator adapted to generate partial product terms

| | |
|---|---|
| $x_0$ | |
| $x_j\overline{x}_{j-1}$ | where $1 \leq j \leq n-1$ |
| $x_j x_{j-1}$ | where $1 \leq j \leq n-1$ |
| $x_j x_k$ | where $2 \leq j \leq n-1$ and $0 \leq k \leq j-2$ | an adder adapted to combine the partial products to result in a square of the n-bit representation of a number, whereby when partial product terms are present the adder combines the partial product terms to produce a sum Z in accordance with the equation $$Z = x_0 + \sum_{j=1}^{n-1}(x_j\overline{x}_{j-1}2^j + x_j x_{j-1}2^{2j+1}) + \sum_{j=2}^{n-1}\sum_{k=0}^{j-2} x_j x_k 2^{j+k+1}.$$

15. An integrated circuit as recited in claim 14, wherein the adder comprises:
    an adder array adapted to reduce the partial product terms to a plurality of sum terms and a plurality of carry terms; and
    an adder adapted to combine the plurality of sum terms and the plurality of carry terms to provide the square of the n-bit representation.

16. An integrated circuit as recited in claim 15, wherein the adder array is comprised of carry-save adders.

17. An integrated circuit as recited in claim 14, wherein the adder is adapted to combine the sum and carry terms is a carry propagate adder.

18. An integrated circuit as recited in claim 14, wherein the adder comprises:
    an adder array adapted to reduce the partial product terms to a plurality of sum terms and a plurality of carry terms; and
    an adder adapted to combine the plurality of sum terms and the plurality of carry terms to provide the square of the n-bit representation.

19. An integrated circuit as recited in claim 14, wherein the integrated circuit is a digital signal processor.

20. An integrated circuit including a circuit for squaring an n-bit representation of a number, comprising:
    a partial product generator to generate partial product terms

| | |
|---|---|
| $x_0$ | |
| $x_j\overline{x}_{j-1}$ | where $1 \leq j \leq n-2$ |
| $x_j x_{j-1}$ | where $1 \leq j \leq n-2$ |
| $x_j x_k$ | where $2 \leq j \leq n-2$ and $0 \leq k \leq j-2$ |
| $x_j x_{n-1}$ | where $0 \leq j \leq n-3$ |
| $x_{n-1}\overline{x}_{n-2}$ | |
| 1 | | an adder to combine the partial products to result in a square of the n-bit representation of a number.

21. An integrated circuit as recited in claim 20, wherein the adder is adapted to combine the partial product terms to produce a sum Z in accordance with the equation $$Z = \overline{x_{n-1}\overline{x_{n-2}}}2^{2n-1} + \overline{x_{n-1}\overline{x_{n-2}}}2^{2n-2} + 2^n +$$
$$\sum_{j=0}^{n-3} \overline{x_j x_{n-1}} 2\, 2^{j+n} + x_0 + \sum_{j=1}^{n-2}(x_j\overline{x}_{j-1}2^{2j} + x_j x_{j-1}2^{2j+1}) +$$
$$\sum_{j=2}^{n-2}\sum_{k=0}^{j-2} x_j x_k 2^{j+k+1}.$$

22. An integrated circuit as recited in claim 21, wherein the adder comprises:
    an adder array adapted to reduce the partial product terms to a plurality of sum terms and a plurality of carry terms; and
    an adder adapted to combine the plurality of sum terms and the plurality of carry terms to provide the square of the n-bit representation.

23. An integrated circuit as recited in claim 20, wherein the adder comprises:
    an adder array adapted to reduce the partial product terms to a plurality of sum terms and a plurality of carry terms; and
    an adder adapted to combine the plurality of sum terms and the plurality of carry terms to provide the square of the n-bit representation.

24. An integrated circuit as recited in claim 23, wherein the adder array is comprised of carry-save adders.

25. An integrated circuit as recited in claim 23, wherein the adder adapted to combine the sum and carry terms is a carry propagate adder.

26. An integrated circuit as recited in claim 20, wherein the integrated circuit is a digital signal processor.

* * * * *